United States Patent [19]
Hashimoto et al.

[11] Patent Number: 5,945,361
[45] Date of Patent: *Aug. 31, 1999

[54] HEAT-RESISTANT EXPANSIVE MEMBER

[75] Inventors: Akira Hashimoto; Susumu Hoshi, both of Sanda, Japan

[73] Assignee: Nippon Pillar Packing Co., Ltd., Osaka, Japan

[*] Notice: This patent is subject to a terminal disclaimer.

[21] Appl. No.: 08/383,679

[22] Filed: Feb. 1, 1995

Related U.S. Application Data

[63] Continuation of application No. 08/022,421, Feb. 16, 1993, abandoned, which is a continuation of application No. 07/861,161, Mar. 27, 1992, abandoned, which is a continuation of application No. 07/518,532, May 3, 1990, abandoned.

[30] Foreign Application Priority Data

May 18, 1989 [JP] Japan ..................... 1-125191

[51] Int. Cl.$^6$ ..................... B32B 19/06
[52] U.S. Cl. ............ 501/95.1; 106/15.05; 252/62; 252/378 R; 428/331; 428/913; 428/920; 428/327
[58] Field of Search ............... 106/15.05, 672, 106/675, 711, DIG. 3, DIG. 4; 252/378 R, 62; 428/327, 331, 454, 913, 920; 501/95.1

[56] References Cited

U.S. PATENT DOCUMENTS

| | | | |
|---|---|---|---|
| 3,916,057 | 10/1975 | Hatch et al. | 428/236 |
| 4,305,992 | 12/1981 | Langer et al. | 428/324 |
| 4,746,570 | 5/1988 | Suzaki et al. | 428/327 |

FOREIGN PATENT DOCUMENTS

| | | |
|---|---|---|
| 59-47712 | 11/1984 | Japan . |
| 58-208164 | 11/1986 | Japan . |
| 61-35143 | 11/1986 | Japan . |

Primary Examiner—Michael Marcheschi
Attorney, Agent, or Firm—Jones, Tullar & Cooper, P.C.

[57] ABSTRACT

The present invention relates to a heat-resistant expansive member suitably used as a holding member for holding a ceramic monolithic catalyst in a motor vehicle or the like. The heat-resistant expansive member of the present invention is made at the blending ratio of 1 to 5 wt % of sepiolite, 30 to 60 wt % of treated vermiculite, 20 to 40 wt % of ceramic fibers and 5 to 20 wt % of an organic binder, or at the blending ratio of 21 to 30 wt % of sepiolite, 30 to 40 wt % of treated vermiculite, 20 to 40 wt % of ceramic fibers and 5 to 20 wt % of an organic binder. Regardless of the low- or high-temperature zone, the heat-resistant expansive member of the present invention presents a great holding force to the monolithic catalyst or the like. The heat-resistant expansive member is improved in cushioning properties and gas-attack resisting properties particularly in the high-temperature zone.

10 Claims, 5 Drawing Sheets

FIG. 7

HEAT-RESISTANT EXPANSIVE MEMBER

This is a continuation application Ser. No. 08/022,421 filed on Feb. 16, 1993, now abandoned which is a continuation application of Ser. No. 07/861,161, filed Mar. 27, 1992, abandoned which is a continuation application of Ser. No. 07/518,532, filed May 3, 1990 abandoned.

BACKGROUND OF THE INVENTION

1. Field of the Invention

The present invention relates to a heat-resistant expansive member in the form of, for example, a sheet preferable as a holding member of a ceramic honeycomb monolithic catalyst forming a catalyst converter in a low pollution engine capable of purifying the emission by oxidizing or reducing harmful components discharged from an automotive engine such as carbon monoxide, hydrocarbon and nitrogen oxides.

2. Description of the Prior Art

The ceramic honeycomb monolithic catalyst excellent in high temperature characteristic is considered to be preferred as the catalyst for achieving a low pollution engine by purifying the emission from the engine by oxidizing or reducing the harmful components discharged from the automotive engine, such as carbon monoxide, hydrocarbon and nitrogen oxides.

Since the ceramics are brittle and inferior in toughness, the ceramic catalyst as installed, is surrounded by a cushioning holding member, in a metallic casing in order to prevent the ceramic catalyst from being damaged due to a mechanical shock such as vibration occurring when the vehicle is running.

The ceramic honeycomb monolithic catalyst is exposed to the high temperature emission of the engine, and therefore a holding member is required to have an excellent heat resistance so as not to be lowered in high temperature strength. Further, since the emission is gradually heightened in temperature as the engine runs continuously, the holding member is thermally expanded depending on the temperature increase. Even in such circumstances, it is required that the holding force and cushioning properties for the ceramic honeycomb monolithic catalyst are not lowered.

As the holding member of the monolithic catalyst capable of satisfying such requirements, there is known, for example, the heat-resistant expansive sheet disclosed in the Japanese Patent Publication 61-35143.

This heat-resistant expansive sheet is composed of 40 to 65 wt % of treated vermiculite as obtained by treating particulate vermiculite with an aqueous solution of ammonium dihydrogen phosphate, 25 to 50 wt % of inorganic fibers, and 5 to 15 wt % of a binder selected from the group consisting of inorganic binders.

Figure 3:
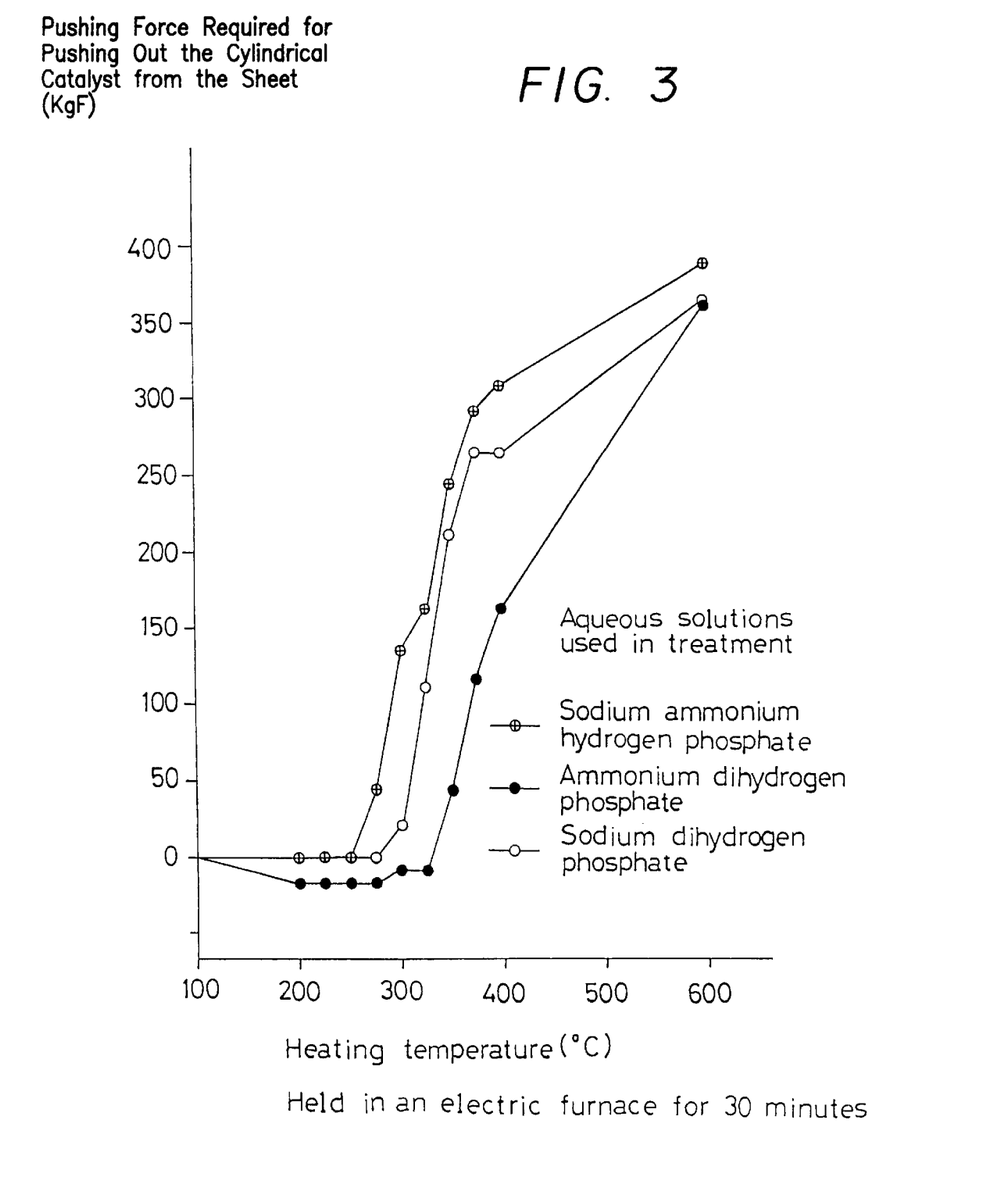
FIG. 3 is a graph showing the coefficients of thermal expansion of vermiculite treated with different solutions.

Table 2 and FIG. 3, show the results of tests conducted on this heat-resistant expansive sheet. As apparent from Table 2 and FIG. 3, the heat-resistant expansive sheet above-mentioned presents a relatively great negative expansion due to a creep phenomenon around 200° C. to 300° C. (more specifically, 200° C. to 325° C.) corresponding to the low temperature zone. Further, the thermal expansion amount at a temperature of 350° C. to 400° C. corresponding to the intermediate temperature zone, is considerably small. This causes the monolithic catalyst to be loosened, so that the holding force for the ceramic honeycomb monolithic catalyst is extremely lowered.

Also apparent from Table 2 and FIG. 3, this heat-resistant expansive sheet is restrained in thermal expansion at a temperature of 600° C. or more corresponding to the high-temperature zone, thereby to lowering the holding force for the ceramic honeycomb monolithic catalyst. Thus, in the conventional heat-resistant expansive sheet, a high holding force is not to be expected in both low- and high-temperature zones, causing the monolithic catalyst to be readily loosened.

Further, since this conventional heat-resistant expansive sheet is retained in shape with an inorganic binder only, that part of the holding member exposed to the a high temperature exhaust gas flowing at high speed, may gradually fall. Accordingly, the monolithic catalyst holding performance dissapears with the passage of time. That is, this conventional sheet presents the problem that the gas-attack resisting properties are very poor.

There is also known a heat-resistant expansive sheet obtained by treating the particulate vermiculite mentioned earlier with sodium dihydrogen phosphate. In this sheet, the negative expansion in the low-temperature zone may be restrained, but the thermal expansion at the intermediate- and high-temperature zones is small. Thus, a sufficient holding force is not be expected (See Table 2 and FIG. 3).

SUMMARY OF THE INVENTION

In view of the foregoing, the present invention is proposed with the object of providing a heat-resistant expansive member which assures a great holding force from a low-temperature zone to a high-temperature zone, thereby to preventing the monolithic catalyst from being loosened due to a mechanical shock such as vibration or the like occurring while the motor vehicle travels, and which also assures cushioning properties particularly in the high-temperature zone, thereby to preventing the ceramic honeycomb monolithic catalyst from being damaged, and which is improved in gas-attack resisting properties, thereby preventing the decrease in holding performance with the passage of time.

It is another object of the present invention to provide a heat-resistant expansive member which starts expanding even in the low-temperature zone, assuring a great holding force for the monolithic catalyst from the low-temperature zone to the high-temperature zone.

To achieve the objects above-mentioned, the heat-resistant expansive member in accordance with an embodiment of the present invention contains 1 to 5 wt % of sepiolite, 30 to 60 wt % of treated vermiculite, 20 to 40 wt % of ceramic fibers, and 5 to 20 wt % of an organic binder.

The heat-resistant expansive member having the arrangement above-mentioned contains 1 to 5 wt % of sepiolite, thereby to decrease a negative expansion caused by a creep phenomenon occurring in the low-temperature zone around 300° C. This improves the holding force in the low-temperature zone. Further, the heat-resistant expansive member of the present invention is increased not only in heat resistance in the high-temperature zone of 600° C. or more, but also in shape retention to improve the gas-attack resisting properties. Further, the heat-resistant expansive member of the present invention contains 30 to 60 wt % of treated vermiculite. This improves not only the cushioning properties capable of effectively relaxing a mechanical shock such as vibration or the like, but also the expansion amount and expansion force for assuring the holding force. This holding force is gradually increased toward the high-temperature zone of 600° C. or more since the heat-resistant expansive member starts expanding at a temperature as low as 275° C. Accordingly, regardless of the low- or high-temperature zone, the heat-resistant expansive member of the present invention may properly hold, with a great holding force, the ceramic honeycomb monolithic catalyst fragile and poor in toughness such that the monolithic catalyst is not loosened. It is therefore possible to prevent the ceramic honeycomb monolithic catalyst from being damaged when a mechanical shock such as vibration or the like is applied thereto during the motor vehicle travel. More specifically, the treated vermiculite is contained in an amount considerably greater than that of sepiolite, so that in particular the amount of expansion and the expansion force of the heat-resistant expansive member is increased and a moderate gas-attack resisting property is assured. Accordingly, the heat-resistant expansive member is suitable as a holding member for the catalyst converter for a four-wheel motor vehicle. The heat-resistant expansive member is exposed to a slightly lowered flowing speed is being the exhaust gas, although the compressive strength of the ceramic honeycomb monolithic catalyst is great and the metallic casing is thick so that the catalyst converter has great rigidity. Further, the heat-resistant expansive member contains 20 to 40 wt % of ceramic fibers. This increases the heat resistance of the heat-resistant expansive member, thereby preventing the occurrence of negative expansion in the low-temperature zone. Further, the ceramic fibers serve as a binder to improve the holding properties of the heat-resistant expansive member particularly in the high temperature zone where the organic binder perfectly disappears. Further, the heat-resistant expansive member contains 5 to 20 wt % of an organic binder, thus improving the shape retention at an ordinary temperature to assure handling convenience.

To achieve the objects above-mentioned, in particular the heat-resistant expansive member in accordance with another embodiment of the present invention contains 21 to 30 wt % of sepiolite, 30 to 40 wt % of treated vermiculite, 20 to 40 wt % of ceramic fibers, and 5 to 20 wt % of an organic binder.

This heat-resistant expansive member contains 21 to 30 wt % of sepiolite, thereby to decreasing the negative expansion thereof due to a creep phenomenon occurring in the low-temperature zone around 300° C. This improves the holding force of the heat-resistant expansive member in the low-temperature zone. Also, the heat resistance of this heat-resistant expansive member is increased in the high-temperature zone of 600° C. or more, thereby assuring a great holding force. Moreover, over, the shape retention of the heat-resistant expansive member is considerably increased, assuring excellent gas-attack resisting properties. Further, this heat-resistant expansive member contains 30 to 40 wt % of treated vermiculite. This improves not only the cushioning properties for effectively relaxing a mechanical shock such as vibration or the like, but also the expansion amount and expansion force for assuring a holding force. Such a holding force is gradually increased in the high-temperature zone of 600° C. or more because of the expansion of the heat-resistant expansive member which has started from 275°0 C. Accordingly, regardless of the low- or high-temperature zone, this heat-resistant expansive member may properly hold, with a great holding force, the ceramic honeycomb monolithic catalyst fragile and poor in toughness such that the monolithic catalyst is not loosened. It is therefore possible to prevent the ceramic honeycomb monolithic catalyst from being damaged when a mechanical shock such as vibration or the like is applied thereto during motor vehicle travel. More specifically, the blending amount of the sepiolite is considerably increased to restrain the expansion amount and expansion force, while improving the heat resistance and shape retention, assuring excellent gas-attack resisting properties. Accordingly; this heat-resistant expansive member is suitable for a holding member for the catalyst converter as a two-wheel motor vehicle exposed to the exhaust gas flowing at a high speed, although the compressive strength of the ceramic honeycomb monolithic catalyst is small and the metallic casing is thin so that the catalyst converter has small rigidity. Likewise in the heat-resistant expansive member previously mentioned, 20 to 40 wt % of ceramic fibers contained in this heat-resistant expansive member prevent the occurrence of negative expansion in the low-temperature zone. Further, the ceramic fibers serve as a binder to improves the holding properties of the heat-resistant expansive member particularly in the high temperature zone. Further, 5 to 20 wt % of the organic binder contained in this heat-resistant expansive member improves the shape retention at an ordinary temperature to assure handling convenience.

According to the present invention, the heat-resistant expansive member preferably contains treated vermiculite as obtained by treating particulate vermiculite with an aqueous solution of sodium ammonium hydrogen phosphate. The particulate vermiculite contains cations apt to be exchanged with $Na^+$ ions, and cations apt to be exchanged with $NH4^+$ ions. Accordingly, when the particulate vermiculite is immersed in the aqueous solution above-mentioned containing both these both ions, the cations in the particulate vermiculite are effectively ion-exchanged in the aqueous solution. By such an ion exchange, the expansion amount and expansion force of the vermiculite are further increased even in the low-temperature zone.

Other features and objects of the present invention will be readily understood from the following description of the various embodiments thereof.

DETAILED DESCRIPTION OF THE PREFERRED EMBODIMENTS

Figure 1:
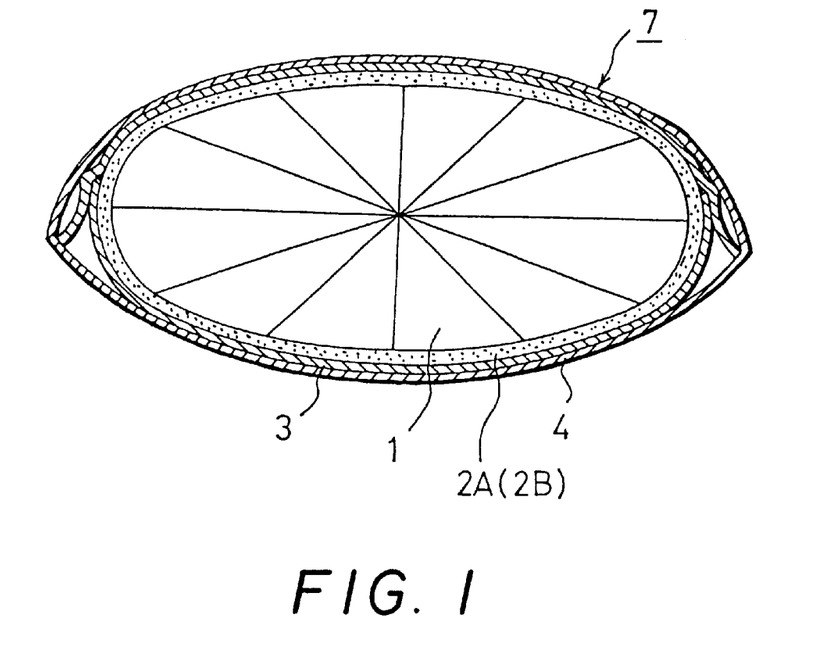
FIG. 1 is a schematic section view of an example of a catalyst converter.

FIG. 1 is a schematic section view of an example of a catalyst converter. In FIG. 1, a ceramic honeycomb monolithic catalyst 1 is surrounded by a heat-resistant expansive sheet 2A or 2B and mounted on a two-half metallic casing 3. A metallic band 4 fastens the outer periphery of the casing 3.

The heat-resistant expansive sheet 2A according to a first variant of the present invention may be manufactured by the beater sheeting method at the blending ratio of 1 to 5 wt % of sepiolite, 30 to 60 wt % of treated vermiculite, 20 to 40 wt % of ceramic fibers, and 5 to 20 wt % of an organic binder. The two-half metallic casing 3 and the metallic band 4 are made of SUS 304.

The sepiolite, forming the heat-resistant expansive sheet 2A is available in two types depending on the degree of crystallization. That is, the fibrous type with high degree of crystallization is called α-sepiolite, while the powder type with low degree of crystallization or amorphous state is called β-sepiolite. Since the β-sepiolite is in the form of powder and is inferior in interlocking performance with ceramic fibers or vermiculite, the α-sepiolite is used. Or both α-sepiolite and β-sepiolite may be jointly used. The sepiolite is solidified when kneaded in water and is dried. At a temperature of 40 to 800° C., light sintering properties are obtained. In particular, the α-sepiolite interlocks very well with ceramic fibers and vermiculite, and is not broken, unlike glass fibers and ceramic fibers, even though rubbed or tightened. Accordingly, the heat-resistant expansive sheet 2A containing the sepiolite prevents the occurrence of a negative expansion around 300° C. under surface pressure loading. This improves the holding force to the ceramic honeycomb monolithic catalyst 1.

The treated vermiculite is obtained by treating particulate vermiculite with an aqueous solution of sodium ammonium hydrogen phosphate. The particulate vermiculite contains cations apt to be exchanged with $Na^+$ ions and cations apt to be exchanged with $NH_4^+$ ions. Accordingly, when the particulate vermiculite is immersed in the aqueous solution above-mentioned containing both these ions, the cations in the particulate vermiculite are effectively ion-exchanged in the aqueous solution. By such an ion exchange, the expansion amount and expansion force of the vermiculite are increased.

The ceramic fibers not only improve the heat resistance, but also prevent a negative expansion around 300° C. The ceramic fibers serve as a binder to improve the shape retention of the sheet particularly in a high-temperature zone where the organic binder perfectly disappears.

As the organic binder, there may be advantageously used a vinyl acetate-ethylene-acrylate copolymer, an acrylate polymer, cellulose pulp, a synthetic rubber (for example, NBR manufactured by Nippon Zeon Co., Ltd.), or the like. The vinyl acetate-ethylene-acrylate copolymer excellent in anchorage is preferred. The content of the organic binder should be within a range from 5 to 20 wt % because the flexibility at an ordinary temperature is insufficient at less than 5 wt %.

One thousand grs. of particulate vermiculite from South Africa was immersed in each of three different aqueous solutions as shown in Table 1 at an ordinary temperature for 120 hours. After being washed with running water, the vermiculite was dried at 105° C. for 2 hours and heated at a predetermined heating temperature for 30 minutes. Thereafter, its specific volume was measured with a measuring cylinder. The measurement results are shown in Table 2 and FIG. 3.

TABLE 1

| Treating Chemical | Treating Aqueous Solutions | | |
|---|---|---|---|
| | Sodium ammonium hydrogen phosphate | Ammonium dihydrogen phosphate | Sodium dihydrogen phosphate |
| Amount (g) | 150 | 150 | 400 |
| Water (g) | 850 | 850 | 800 |

TABLE 2

Expansion Degree of Vermiculite by Heat Treatment (Specific volume cc/g)

| Heat Treatment | Treating Solution | | |
|---|---|---|---|
| | Sodium ammonium hydrogen phosphate Vermiculite No. 1 | Ammonium dihydrogen phosphate Vermiculite No. 1 | Sodium dihydrogen phosphate Vermiculite No. 1 |
| Unheated | 1.1 (0) | 1.1 (0) | 0.9 (0) |
| 200° C. | 1.1 (0) | 0.9 (−18) | 0.9 (0) |
| 225° C. | 1.1 (0) | 0.9 (−18) | 0.9 (0) |
| 250° C. | 1.1 (0) | 0.9 (−18) | 0.9 (0) |
| 275° C. | 1.6 (45) | 0.9 (−18) | 0.9 (0) |
| 300° C. | 2.6 (136) | 0.9 (−9) | 1.1 (22) |
| 325° C. | 2.9 (164) | 1.0 (−9) | 1.9 (111) |
| 350° C. | 3.8 (245) | 1.6 (45) | 2.8 (211) |
| 375° C. | 4.3 (291) | 2.4 (118) | 3.3 (267) |
| 400° C. | 4.5 (309) | 2.9 (164) | 3.3 (268) |
| 600° C. | 5.4 (391) | 5.1 (364) | 4.2 (367) |

In Table 2, the numerals in parenthsis represent thermal expansion coefficients in %. The vermiculite No. 1 has a grain size of 0.5 to 2 mm.

As shown in Table 2, the vermiculite treated with sodium ammonium hydrogen phosphate had no shrinkage, i.e., negative expansion, at a temperature of 200 to 300° C. as was the case in the vermiculite treated with ammonium dihydrogen phosphate. Further, the vermiculite treated with sodium ammonium hydrogen phosphate had a degree of an expansion (expansion amount) higher than that of the vermiculite treated with sodium dihydrogen phosphate, and started expanding at a temperature as low as 275° C.

Figure 2:
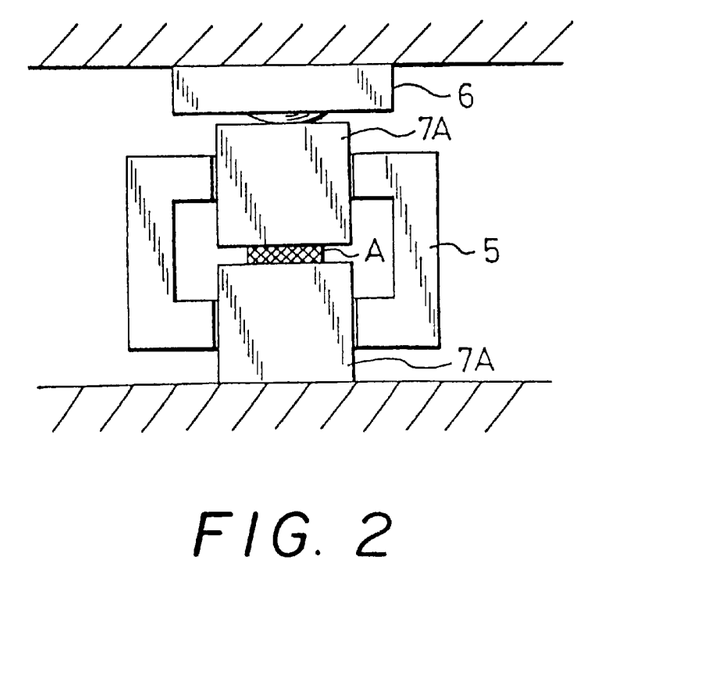
FIG. 2 is a schematic front view of a thermal expansion measuring apparatus.

Two examples of the heat-resistant expansive sheet were manufactured by the beater sheeting method at the blending ratio of 4 wt % of α-sepiolite, 54 wt % of each of the treated vermiculites No. 0 and No. 1 as shown in Table 3, 30 wt % of ceramic fibers, and 12 wt % of a vinyl acetate-ethylene-acrylate copolymer as an organic binder. Each sheet thus formed had a thickness of 4.9 mm and, density of 0.5 to 0.8 g/cm$^3$, preferably 0.7 g/cm$^3$. From each sheet, there was prepared a sample piece A having a diameter of 15 mm and a thickness of 4.9 mm. As shown in FIG. 2, each piece A was compressed by quartz rods 7A with the use of a load cell 6 in a heating furnace 5 so as to have a thickness of 3 mm. There was measured the thermal expansion force of each piece A while the temperature was increased to 75° C. for about 50 minutes. The results are shown in Table 3.

TABLE 3

Thermal Expansion of Heat-Resistant Expansive Sheet (kgf)

| Temp. | Measured Grain Size of Vermiculite | |
|---|---|---|
| | No. 0 0.1 to 1 mm | No. 1 0.5 to 2 mm |
| 400° C. | 4 kgf | 7 kgf |
| 500° C. | 19 kgf | 18 kgf |
| 600° C. | 39 kgf | 38 kgf |
| 700° C. | 52 kgf | 43 kgf |
| 750° C. | 54 kgf | 42 kgf |

It is apparent from Table 3 that, the each sample piece A presents a high expansion force even in the high-temperature zone. In particular, the sheet using the vermiculite No. 0 having a smaller grain size, presents a higher expansion force and a smaller decrease in expansion force at a high temperature. Accordingly, such a sheet is suitable for a holding member for holding a ceramic catalyst in a motor vehicle or the like which is required to present a high expansion force even at a high temperature. The vermiculite No. 1 having a greater grain size is slightly inferior in expansion force to the vermiculite No. 0 having a smaller grain size. As shown in Table 2, however, the expansion amount of the vermiculite No. 1 depends on the treating aqueous solution used. Accordingly, the vermiculite No. 1 had a relatively great expansion amount and may be suitably used for, for example, a refractory sealing material for covering the outer periphery of a power transmission line passing through a through-hole in a built wall.

Figure 4:
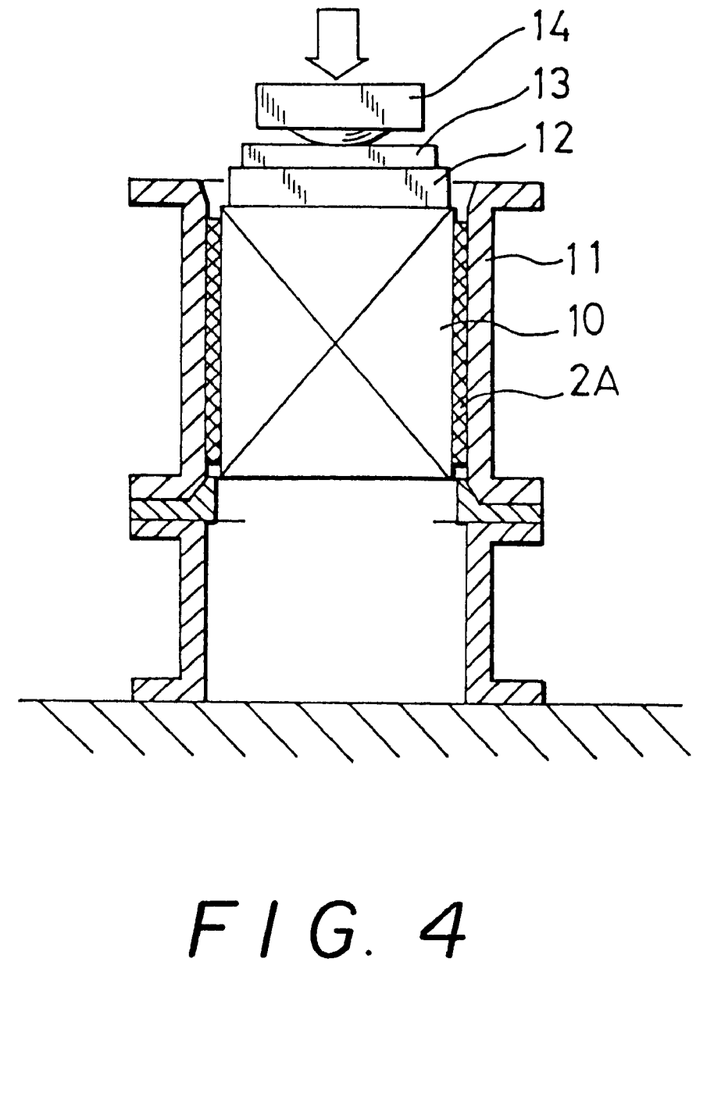
FIG. 4 is a section view of an apparatus for measuring the holding force of a heat-resistant expansive sheet.

Each cylindrical catalyst 10 having an outer diameter of 76 mm shown in FIG. 4 was surrounded, at the outer periphery thereof, by each of the heat-resistant expansive sheet 2A of the present invention and a conventional heat-resistant expansive sheet (Japanese Patent Publication 61-35143). Each catalyst-sheet assembly was loaded in a metallic cylindrical casing 11 having an inner diameter of 82.2 mm and subjected to a heat-treatment. Then, each cylindrical catalyst 10 was pushed in a direction shown by the arrow at a compression speed of 50 m/min. by a load cell 14 through a rubber plate 12 and a metallic plate 13. Thus, the pushing force required for pushing out each cylindrical catalyst 10, i.e., the holding force provided by each heat-resistant expansive sheet was measured. The results are shown in Table 4 and a graph in FIG. 5.

TABLE 4

Pushing Force Applied to Cylindrical Catalyst (kgf)

|  |  | Invention Sheet | Conventional Sheet |
| --- | --- | --- | --- |
| Ordinary Temp. | — | 70 | 65 |
| 225 | 6 hrs. or more | 92 | 62 |
| 325 | 6 hrs. or more | 59 | 12 |
| 425 | 6 hrs. or more | 72 | 55 |
| 600 | 6 hrs. or more | 92 | 62 |
| 800 | 6 hrs. or more | 300 | 180 |

Figure 5:
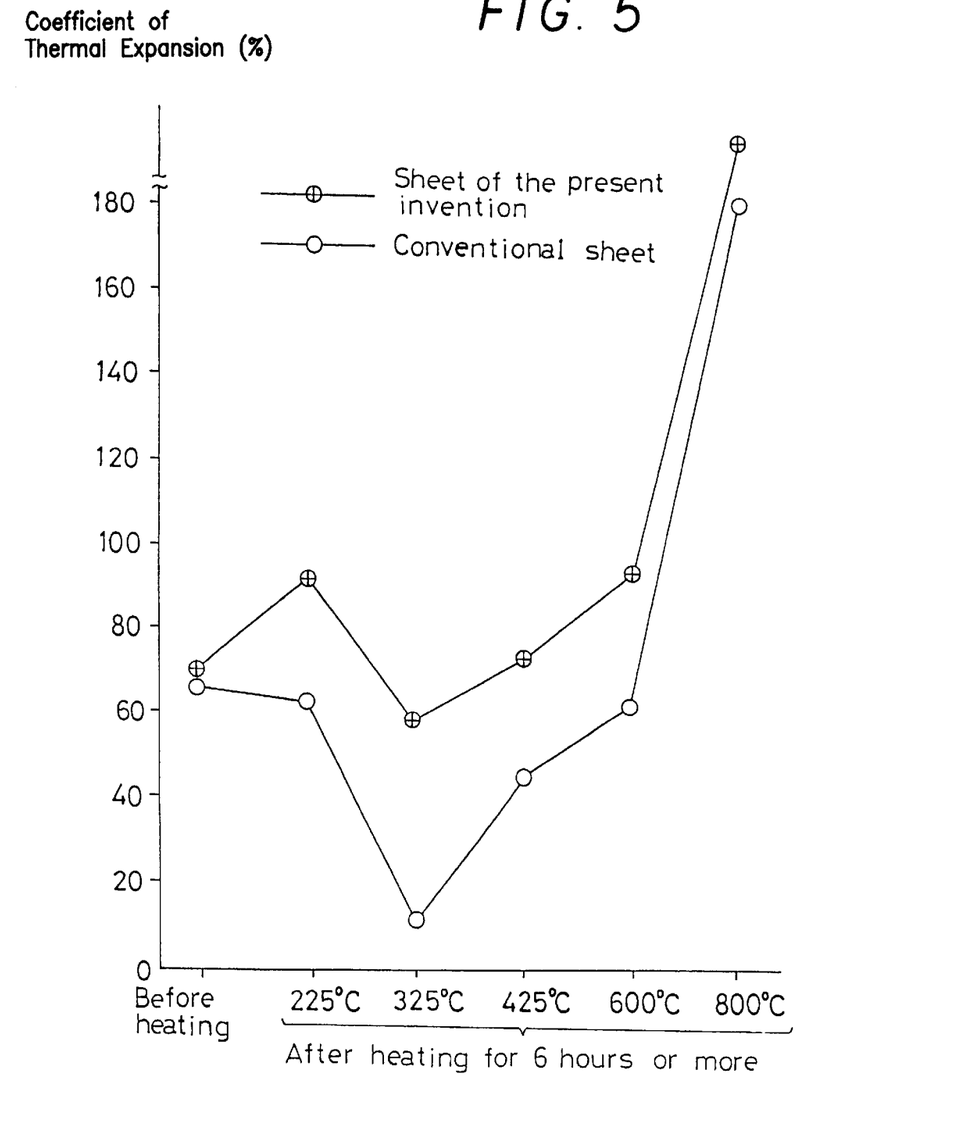
FIG. 5 is a graph comparatively showing measurement results of the holding force.

It is apparent from Table 4 and the graph in FIG. 5 that the conventional heat-resistant expansive sheet is considerably decreased in holding force at 325° C. due to the negative expansion mentioned earlier, and presents a small holding force at a high temperature of 600° C. or more. It is also apparent that the heat-resistant expansive sheet 2A of the present invention presents no considerable decrease in holding force even in a negative expansion zone at 325° C., and assures a great holding force in a high-temperature zone of 600° C. or more. It may be considered that such effects of the present invention have been produced by the synergistic effect of the respective expansion amounts and respective expansion forces of the vermiculite treated with sodium ammonium hydrogen phosphate and the sepiolite which was not contained in the conventional sheet.

The heat-resistant expansive sheet 2B in accordance with a second variant of the present invention may be manufactured by the beater sheeting method at the blending ratio of 21 to 30 wt % of sepiolite, 30 to 40 wt % of vermiculite treated with sodium ammonium hydrogen phosphate, 20 to 40 wt % of ceramic fibers, and 5 to 20 wt % of an organic binder.

According to the heat-resistant expansive sheet 2B, the blending ratio of sepiolite is considerably increased as compared with the heat-resistant expansive sheet 2A, thereby to improving the heat resistance in a high-temperature zone. Further, the blending ratio of the treated vermiculite is slightly lowered, thereby slightly restraining the expansion amount and expansion force of the heat-resistant expansive sheet 2B.

Thus, the heat-resistant expansive sheet 2A of the first variant of the present invention having a greater expansion amount and a greater expansion force than those of the heat-resistant expansive sheet 2B of the second variant of the present invention, may be suitable for a holding member of a catalyst converter having great rigidity mounted on the exhaust system of a four-wheel motor vehicle. On the other hand, the heat-resistant expansive sheet 2B of the second variant of the present invention may be suitable for a holding member of a catalyst converter mounted on the exhaust system of a two-wheel motor vehicle, i.e., a catalyst converter the rigidity of which is slightly lower than that of the catalyst converter for a four-wheel motor vehicle. In other words, as compared with the catalyst converter for a four-wheel motor vehicle, the catalyst converter for a two-wheel motor vehicle presents smaller rigidity since the compressive strength of the honeycomb monolithic catalyst 1 is smaller and the metallic casing 3 is thinner. However, when the heat-resistant expansive sheet 2B the expansion amount of which and expansion force are being restrained, is used for the catalyst converter for a two-wheel motor vehicle, it is possible to prevent the monolithic catalyst 1 from being broken and the metallic casing 3 from being abnormally deformed due to excessive expansion.

By the beater sheeting method, there were manufactured, at the blending ratios set forth in Table 5, examples of the heat-resistant expansive sheets 2A, 2B of the present invention each having a thickness of 4.9 mm, a width of 25 mm, a length of 25 mm, and density of 0.5 to 0.8 g/cm, preferably 0.7 g/cm. There was also manufactured a conventional heat-resistant expansive sheet having the same dimensions and density as those of the sheets of the present invention. The gas-attack resisting properties of such sheets 2A, 2B and the conventional sheet were measured, with the use of a gas-attack resisting property testing apparatus shown in FIGS. 6 and 7. The test results are shown in Table 6.

Figure 6:
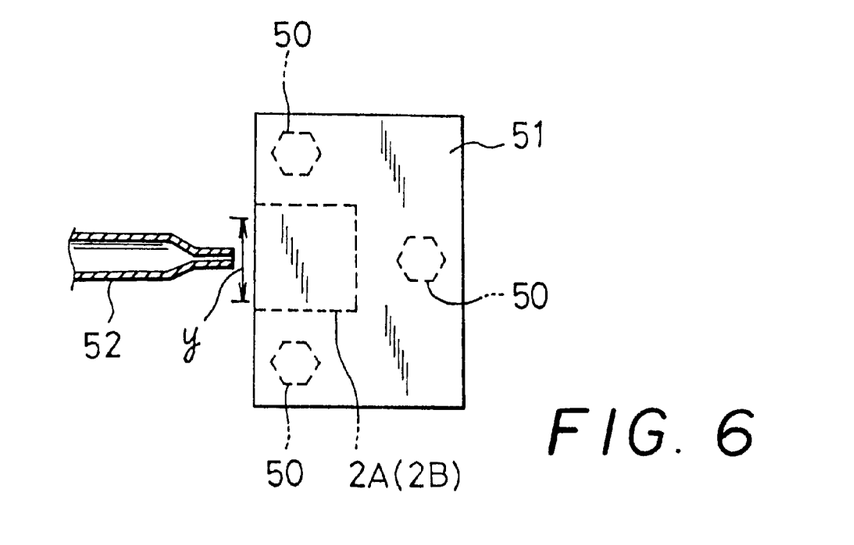
FIG. 6 is a schematic side view of an apparatus for testing gas-attack resisting properties.
Figure 7:
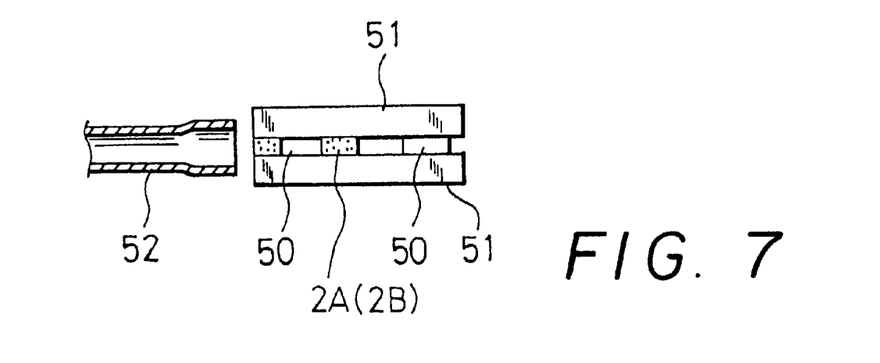
FIG. 7 is a schematic plan view of the apparatus in FIG. 6.

The gas-attack resisting property testing apparatus in FIGS. 6 and 7, includes two plates 51 between and by which each heat-resistant expansive sheet is held through a plurality of gap spacers 50, and a flat nozzle 52 to be reciprocated (with a traverse amount of 19.1 mm), as facing the end surface of each heat-resistant expansive sheet, at a speed of 20 cycles/min. in a direction y. This nozzle 52 is adapted to blow air of 2.5 kgf/cm$^2$. The test was conducted according to a pattern of (i) heating at 600° C. for one hour, (ii) cooling, (iii) measurement of the weight, (iv) blowing of air in 3000 cycles, (v) measurement of the weight, (vi) blowing of air in 3000 cycles, and (vii) measurement of the weight.

TABLE 5

Blending Ratio in Heat-Resistant Expansive Sheet (wt %)

|  | Heat-Resistant Expansive Sheet 2A | Heat-Resistant Expansive Sheet 2B |
| --- | --- | --- |
| Vermiculite | 54 | 37 |
| Sepiolite | 4 | 21 |
| Ceramic Fibers | 30 | 30 |

TABLE 5-continued

Blending Ratio in Heat-Resistant Expansive Sheet (wt %)

|  | Heat-Resistant Expansive Sheet 2A | Heat-Resistant Expansive Sheet 2B |
|---|---|---|
| (alumina, silicate) Organic Binder* | 12 | 12 |

*Vinyl acetate-ethylene-acrylate copolymer

TABLE 6

Weight Decrease of Heat-Resistant Expansive Sheet (%)

|  | Invention Sheet 2A | Invention Sheet 2B | Conventional Sheet |
|---|---|---|---|
| After 3000 Cycles | 5.5 | 0.9 | 28 |
| After 6000 Cycles | 6.5 | 1.1 | 33 |

It is apparent from Table 6 that each of the heat-resistant expansive sheets of the present invention presents remarkably excellent gas-attack resisting properties as compared with the conventional sheet. It is therefore possible to prevent the heat-resistant sheet of the present invention from being lowered in its holding performance with the passage of time. This may be considered to be achieved by improvements in shape retention due to the presence of sepiolite.

The heat-resistant expansive sheet 2B having a higher blending amount of sepiolite is superior in gas-attack resisting properties to the heat-resistant expansive sheet 2A. Accordingly, the heat-resistant expansive sheet 2B excellent in gas-attack resisting properties is suitable for a holding member for the exhaust system of a two-wheel motor vehicle in which the distance between the engine exhaust port and the catalyst converter is short and the catalyst converter is therefore exposed to the exhaust gas flowing at a high speed so that the heat-resistant expansive sheet is susceptible to severe gas attack. On the other hand, the heat-resistant expansive sheet 2A is suitable for a holding member for the exhaust system of a four-wheel motor vehicle in which the distance between the engine exhaust port and the catalyst converter is long and the catalyst converter is therefore exposed to the exhaust gas the speed of which is being slightly lowered, so that the gas attack on the heat-resistant expansive sheet is relatively small.

What is claimed is:

1. A heat-resistant expansive member, comprising: 1 to 5 wt % of sepiolite; 30 to 60 wt % of treated vermiculite; 20 to 40 wt % of ceramic fibers; and 5 to 20 wt % of a vinyl acetate-ethylene-acrylate copolymer, wherein the treated vermiculite is obtained by treating particulate vermiculite with an aqueous solution of sodium ammonium hydrogen phosphate.

2. A heat-resistant expansive member according to claim 1, wherein the particulate vermiculite has a grain size of 0.1 to 1 mm.

3. A heat-resistant expansive member according to claim 1, wherein the sepiolite is α-type sepiolite.

4. A heat-resistant expansive member according to claim 1, made at the blending ratio of 4 wt % of α-type sepiolite, 54 wt % of treated vermiculite, 30 wt % of ceramic fibers, and 12 wt % of a vinyl acetate-ethylene-acrylate copolymer as the organic binder.

5. A heat-resistant expansive member according to claim 4, made by the beater sheeting seating method and having a density of 0.5 to 0.8 g/cm$^3$.

6. A heat-resistant expansive member, comprising: 21 to 30 wt % of sepiolite; 30 to 40 wt % of treated vermiculite; 20 to 40 wt % of ceramic fibers; and 5 to 20 wt % of a vinyl acetate-ethylene-acrylate copolymer, wherein the treated vermiculite is obtained by treating particulate vermiculite with an aqueous solution of sodium ammonium hydrogen phosphate.

7. A heat-resistant expansive member according to claim 6, wherein the particulate vermiculite has a grain size of 0.1 to 1 mm.

8. A heat-resistant expansive member according to claim 6, wherein the sepiolite is α-type sepiolite.

9. A heat-resistant expansive member according to claim 6, made at the blending ratio of 21 wt % of α-type sepiolite, 37 wt % of treated vermiculite, 30 wt % of ceramic fibers, and 12 wt % of a vinyl acetate-ethylene-acrylate copolymer as the organic binder.

10. A heat-resistant expansive member according to claim 9, made by the beater sheeting method and having a density of 0.5 to 0.8 g/cm$^3$.

* * * * *

UNITED STATES PATENT AND TRADEMARK OFFICE
CERTIFICATE OF CORRECTION

PATENT NO. : 5,945,361
DATED : August 31, 1999
INVENTOR(S) : Akira Hashimoto et al It is certified that error appears in the above-indentified patent and that said Letters Patent is hereby corrected as shown below:

Claim 5, column 10, line 24, "seating" should be deleted.

Signed and Sealed this

Twenty-fifth Day of April, 2000

Attest:

Attesting Officer

Q. TODD DICKINSON

Director of Patents and Trademarks